United States Patent Office 2,781,368
Patented Feb. 12, 1957

2,781,368

11-KETOTESTOSTERONE, 11-KETO-19-NORTESTOSTERONE, ESTERS THEREOF AND PROCESS

Frederick W. Heyl, Kalamazoo, and Milton E. Herr, Kalamazoo Township, Kalamazoo County, Mich., assignors to The Upjohn Company, Kalamazoo, Mich., a corporation of Michigan No Drawing. Application January 15, 1953,
Serial No. 331,495

14 Claims. (Cl. 260—397.45)

The present invention relates to steroids of the androstane and 10-normethylandrostane series and is more particularly concerned with 11-ketotestosterone, 10-normethyl-11-ketotestosterone, their 17-esters and a process for the production thereof.

The process and products of the present invention may be illustratively represented by the following formulae:

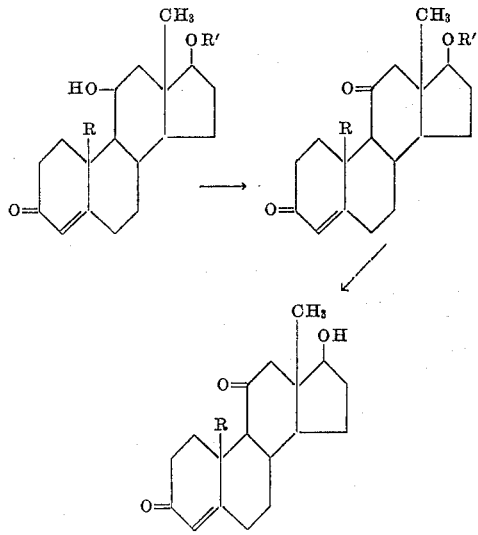

wherein R is hydrogen or methyl and wherein R' is hydrogen or the acyl radical of a carboxylic acid containing from one to eight carbon atoms inclusive, especially those acids selected from the group consisting of aliphatic acids, carbocyclic acids and aromatic acids.

The process of the present invention consists in oxidizing a 17β-ester of 11β-hydroxytestosterone or 10-normethyl-11β-hydroxytestosterone with chromic acid, either as such or as generated in situ to obtain the corresponding 7β-acyloxy-11-ketotestosterone or 17β-acyloxy-10-normethyl-11-ketotestosterone. Hydrolysis of these esters with base yields 11-ketotestosterone or 10-normethyl-11-ketotestosterone, respectively.

It is an object of the present invention to provide 11-ketotestosterone, 10-normethyl-11-ketotestosterone and esters thereof. Another object of the present invention is the provision of a process for the production of 11-ketotestosterone, 10-normethyl-11-ketotestosterone, and esters thereof. Other objects of the invention will be apparent to one skilled in the art to which this invention pertains.

11-ketotestosterone and its esters as well as 10-normethyl-11-ketotestosterone and esters thereof demonstrate androgenic hormonal and adrenocortical activity. These compounds have a pronounced anabolic effect.

The starting compounds of this invention, i. e., the 17β-esters of 11β-hydroxytestosterone and 10-normethyl-11β-hydroxytestosterone, are prepared by heating adrenosterone or 10-normethyladrenosterone (Preparation 2A) with a secondary amine, for example, piperidine, pyrrolidine, N-methyl-toluidine, dibenzylamine, diethylamine, dicyclohexylamine or other like amine, with pyrrolidine being preferred, to yield the corresponding 3-enamine, such as 3-(N-pyrrolidyl)-3,5-androstadiene-11, 17-dione, 3-(N-piperidyl)-3,5-androstadiene-11,17-dione, 3-(N-dibenzylamine)-10 - normethyl - 3,5 - androstadiene - 11,17-dione, 3-(N-diethylamine)-10-normethyl - 3,5 - androstadiene-11,17-dione, and other like enamines. The thus-obtained enamines are then reduced, preferably with a metallic hydride, such as lithium aluminum hydride or sodium borohydride, to yield the corresponding 11β,17β-diols which by hydrolysis give 11β-hydroxytestosterone and 10-normethyl-11β-hydroxytestosterone. Treatment of 11β-hydroxytestosterone or 10-normethyl-11β-hydroxytestosterone with an acylating agent, such as an anhydride of an organic carboxylic acid or an acyl halide wherein the acyl group is the acyl radical of an organic carboxylic acid and wherein the organic carboxylic acid in either case preferably contains from one to eight carbon atoms inclusive, results in the corresponding 17-ester. The formic acid esters of 11β-hydroxytestosterone or 10-normethyl-11β-hydroxytestosterone are obtained by mixing these compounds with formic acid.

Representative starting compounds, thus prepared, include: 17β-formoxy-11β-hydroxytestosterone, 17β-acetoxy-11β-hydroxytestosterone, 17β-propionoxy - 11β - hydroxytestosterone, 17β-butyroxy-11β-hydroxytestosterone, 17β-valeroxy-11β-hydroxytestosterone, 17β-hexanoyloxy-11β-hydroxytestosterone, 17β-heptanoyloxy-11β-hydroxytestosterone, 17β-octanoyloxy - 11β - hydroxytestosterone, 17β-benzoyloxy-11β-hydroxytestosterone, 17β-phenylacetoxy-11β-hydroxytestosterone, 17β - (β-cyclopentyl) - propionoxy-11β-hydroxytestosterone, 17β-formoxy - 10 - normethyl-11β-hydroxytestosterone, 17β - acetoxy - 10 - normethyl-11β-hydroxytestosterone, 17β-propionoxy-10-normethyl-11β-hydroxytestosterone, 17β-butyroxy - 10 - normethyl-11β-hydroxytestosterone, 17β-valeroxy - 10 - normethyl-11β-hydroxytestosterone, 17β - hexanoyloxyl - 10 - methyl 11β-hydroxytestosterone, 17β-heptanoyloxy-10-normethyl-11β-hydroxytestosterone, 17β-octanoyloxy-10-normethyl-11β-hydroxytestosterone, 17β-benzoyloxy - 10-normethyl-11β - hydroxytestosterone, 17 - phenylacetoxy-10-normethyl-11β - hydroxytestosterone, 17β - (β - cyclopentyl) - propionoxy - 10 - normethyl - 11β - hydroxytestosterone, and other like compounds.

In carrying out the process of the present invention, the selected 11β-hydroxytestosterone-17-ester or the selected 10-normethyl-11β-hydroxytestosterone-17-ester, dissolved in an organic solvent such as acetic acid, benzene, toluene, petroleum ether, hexanes (Skellysolve B), dioxane or similar like solvent, with acetic acid preferred, is oxidized with a solution containing chromic acid. The chromic acid may be added as chromic acid anhydride together with a small but sufficient amount of water to produce the dichromate ion ($Cr_2O_7^-$), or may be produced in situ by the reaction between an alkali metal dichromate such as sodium or potassium dichromate and an acid, for example, acetic acid, formic acid, or sulfuric acid. The reaction may be carried out in a heterogeneous or a homogeneous system. If the reaction is carried out in a heterogeneous system, the 11β-hydroxytestosterone-17-ester or the 10-normethyl-11β-hydroxytestosterone-17-ester, dissolved in an organic solvent which is inert to oxidation under the reaction conditions such as benzene, chlorobenzene, hexane, chloroform, or a similar solvent, is admixed with a solution of aqueous sodium dichromate or potassium dichromate acidified with sulfuric acid or sulfuric acid combined with acetic acid. Vigorous agitation is then employed to bring the organic layer into intimate contact with the aqueous solution. The reaction time is mainly dependent on efficient stirring. In the preferred embodiment of the invention, the oxidation is carried out in homogeneous solution, with acetic acid as solvent and chromic acid as oxidizing agent, the chromic acid being produced by the reaction of small amounts of water with chromic anhydride. At the termination of the reaction, excess of chromic acid is destroyed by adding methyl or ethyl alcohol to the solution and concentrating the solution on a steam bath in vacuo. The temperature of reaction is between about zero and about fifty degrees centigrade, with temperatures between about fifteen and thirty degrees centigrade preferred. The reaction time depends on the temperature and may vary between about one-half hour to about ten hours or even longer. At room temperature, i. e., at about 25 degrees centigrade, the reaction time is usually between about three and eight hours. The thus-obtained 11-ketotestosterone-17-ester or 10-normethyl-11-ketotestosterone-17-ester is then purified by recrystallization, if desired.

To obtain 11-ketotestosterone or 10-normethyl-11-ketotestosterone, the esters of these compounds are treated with a base in an organic solvent, such as methanol, ethanol, tertiary butyl alcohol, dioxane, acetone, or other like solvent. In the preferred embodiment of the invention, the 17-ester of 11-ketotestosterone or 10-normethyl-11-ketotestosterone is heated at reflux for a period of about fifteen minutes to one hour with methanolic or ethanolic sodium or potassium hydroxide, whereafter the resulting solution is neutralized with a mineral acid. The resulting precipitate of 11-ketotestosterone or 10-normethyl-11-ketotestosterone may be separated by filtration and recrystallized from an organic solvent, such as a methylene chloride-ether mixture.

The following examples illustrate the process of the present invention but are not to be construed as limiting.

PREPARATION 1A.—3-(N-PYRROLIDYL)-3,5-ANDROSTADIENE-11,17-DIONE

A mixture of six grams (0.02 mole) of adrenosterone, 160 milliliters of benzene, 202 milliliters (0.024 mole) of pyrrolidine and ten milligrams of para-toluenesulfonic acid monohydrate was heated at reflux for a period of eighty minutes in a distilling flask equipped with a water trap. The water formed in the reaction was removed by codistillation with benzene. The benzene was then removed by distillation under reduced pressure and the yellow solid residue was triturated with fifty milliliters of methanol. After cooling, 3-(N-pyrrolidyl)-3,5-androstadiene-11,17-dione was recovered by filtration and dried in vacuo. The weight was 6.23 grams, a yield of 83 percent. When recrystallized from ether, the product melted at 173 to 178 degrees centigrade.

*Analysis.*—Calculated for $C_{23}H_{31}NO_2$: C, 78.14; H, 8.84. Found: C, 78.24; H, 8.72.

(1B) 3-(N-PYRROLIDYL)-3,5-ANDROSTADIENE-11β,17β-DIOL

A solution of 6.23 grams of 3-(N-pyrrolidyl)-3,5-androstadiene-11,17-dione, dissolved in 100 milliliters of anhydrous tetrahydrofuran, was added over a period of five minutes, with stirring, to a mixture of 3.34 grams of lithium aluminum hydride in 900 milliliters of anhydrous ether. The reaction mixture was refluxed for a period of five minutes, whereafter the reaction vessel was cooled in an ice bath. The metal complex was then decomposed by the cautious addition of six milliliters of water. The organic layer was decanted through a fluted filter and the clear ether solution thus obtained, was washed with water, dried over anhydrous sodium sulfate and evaporated to yield 5.26 grams of 3-(N-pyrrolidyl)-3,5-androstadiene-11β,17β-diol. Infrared analysis confirmed the postulated structure of the enamine diol.

(1C) 11β-HYDROXYTESTOSTERONE

Five and twenty-six hundredths grams (5.26 grams) of 3-(N-pyrrolidyl)-3,5-androstadiene-11β,17β-diol, eight grams of sodium acetate, ten milliliters of water, four milliliters of acetic acid and 100 milliliters of methanol were refluxed for a period of five hours. Upon cooling, 750 milliliters of ether was added and the solution washed with dilute sodium carbonate solution, water, and then dried over anhydrous sodium sulfate. Upon evaporation of the ether, 3.02 grams of crude 11β-hydroxytesterone was obtained. Repeated recrystallization from ethyl acetate gave a product of constant melting point; 241 degrees centigrade. Extraction of the aqueous alkaline washings with ether-benzene mixtures and chloroform resulted in an additional 0.93 gram of crystalline material which was chromatographed, together with material from the mother liquor of the first crystallization, over a column of activated alumina. A total of 3.3 grams equal to a yield of 55 percent of pure 11β-hydroxytestosterone was obtained.

(1D) 11β-HYDROXYTESTOSTERONE-17-ACETATE

A solution of 0.91 gram of 11β-hydroxytestosterone, dissolved in six milliliters of dried and redistilled pyridine, was treated with six milliliters of acetic anhydride. After standing at room temperature for seventeen hours, it was poured into ice water. The mixture was filtered after two hours of standing and the precipitate was washed with water and dried in vacuo. The crude yield was 88 percent. Upon recrystallization from an ether-hexane mixture, pure 11β-hydroxytestosterone-17-acetate of melting point 150 degrees centigrade was obtained.

(1E) 11β-HYDROXYTESTOSTERONE-17-PROPIONATE

In the same manner as given in Preparation 1D, by the reaction of 11β-hydroxytestosterone and propionic anhydride, 11β-hydroxytestosterone-17-propionate was obtained in 94 percent yield. The melting point of this compound was 154 to 155 degrees centigrade.

(1F) 11β-HYDROXYTESTOSTERONE-17-BENZOATE

Thirty hundredths gram (0.30 gram) of 11β-hydroxytestosterone, suspended in twelve milliliters of dry benzene, was treated with 0.32 milliliter of distilled benzoyl chloride and 0.32 milliliter of dry pyridine. The mixture was stirred for seventeen hours at room temperature during which time the benzoate was deposited from the solution. After refrigeration, the product was collected on a filter, washed with benzene and ether, and then dried. The crude yield was 0.36 gram (ninety percent). Recrystallized from ethyl acetate, 11β-hydroxytestosterone-17-benzoate melted at 287 degrees centigrade.

In the same manner as given in Preparations 1D, 1E and 1F, the β-cyclopentylpropionate, butyrate, isobutyrate, valerate, isovalerate, hexanoate, heptanoate, octanoate, phenylacetate, and other like 17-esters of 11β-hydroxytestosterone may be prepared by reaction of 11β-hydroxytestosterone and the selected acid anhydride or halide. Treatment of 11β-hydroxytestosterone with formic acid results in 11β-hydroxytestosterone-17-formate.

PREPARATION 2A.—10-NORMETHYLADRENOSTERONE

A medium of sixty grams of Edamine enzymatic digest of lactalbumin, nine grams of corn steep liquor and 150 grams of technical dextrose diluted to three liters with tap water, adjusted to a pH of 4.3 to 4.5 and sterilized, was inoculated with *Rhizopus nigricans* minus strain, American Type Culture Collection Number 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper et al., Ind. Eng. Chem., 36, 504 (1944). To this medium containing a 24-hour growth of *Rhizopus nigricans* minus strain was added 1.5 grams of 10-normethyltestosterone [Birch, J. Chem. Soc. (London) 1950, 367] in thirty milliliters of absolute ethanol to provide a suspension of the steroid in the culture. After an additional 24-hour period of incubation under the same conditions of temperature and aeration, the beer and mycelium were extracted. The mycelium was filtered, washed with acetone and extracted with methylene chloride. The acetone and methylene chloride extracts including solvent were added to the beer filtrate. The mixed extracts and beer filtrate were repeatedly extracted with methylene chloride and the combined extracts were washed with two percent aqueous solution of sodium bicarbonate and then with water. After drying the methylene extracts over anhydrous sodium sulfate, the solvent was removed by evaporation in vacuo. The residue was decolorized by treatment of the methylene dichloride solution with Magnesol (synthetic magnesium silicate). After removal of the solvent, the material was chromatographed over alumina in benzene solution and the thus-obtained material was repeatedly recrystallized from ethyl acetate to give substantially pure 10-normethyl-11α-hydroxytestosterone.

Two and nine tenths grams (2.9 grams) (0.01 mole) of 10-normethyl-11α-hydroxytestosterone thus-obtained were dissolved in forty milliliters of benzene and thereto was added with cooling a solution of ten grams (0.034 mole) of crystalline sodium dichromate in eight milliliters of acetic acid, 13.5 milliliters of concentrated sulfuric acid and 35 milliliters of water. The mixture was stirred for six hours at 25 to thirty degrees centigrade. The benzene solution was then separated, washed with 25-milliliter portions of water and concentrated to dryness in vacuo. The material, 10-normethyladrenosterone, was recrystallized from aqueous ethanol.

(2B) 3-(N-PYRROLIDYL)-3,5-ESTRADIENE-11,17-DIONE

Substituting 10-normethyladrenosterone for adrenosterone in the synthesis of Preparation 1A resulted in 3-(N-pyrrolidyl)-3,5-estradiene-11,17-dione.

(2C) 3-(N-PYRROLIDYL)-3,5-ESTRADIENE-11β,17β-DIOL

In the same manner as given in Preparation 1B, 3-(N-pyrrolidyl)-3,5-estradiene-11,17-dione was reduced with lithium aluminum hydride in ether-tetrahydrofuran solution to give 3-(N-pyrrolidyl)-3,5-estradiene-11β,17β-diol.

(2D) 10-NORMETHYL-11β-HYDROXYTESTOSTERONE

Hydrolysis of 3-(N-pyrrolidyl)-3,5-estradiene-11β,17β-diol with acetic acid and sodium acetate in methanol in the manner given in Preparation 1C resulted in 10-normethyl-11β-hydroxytestosterone.

(2E) 10-NORMETHYL-11β-HYDROXYTESTOSTERONE-17-ACETATE

In the same manner as given in Preparation 1D, 10-normethyl-11β-hydroxytestosterone was treated with acetic anhydride in pyridine to give 10-normethyl-11β-hydroxytestosterone-17-acetate.

(2F) 10-NORMETHYL-11β-HYDROXYTESTOSTERONE-17-PROPIONATE

Treating 10-normethyl-11β-hydroxytestosterone in pyridine solution with propionic anhydride at room temperature in the manner of Preparation 1E yielded 10-normethyl-11β-hydroxytestosterone-17-propionate.

(2G) 10-NORMETHYL-11β-HYDROXYTESTOSTERONE-17-(β-CYCLOPENTYL)-PROPIONATE

Treatment of 10-normethyl-11β-hydroxytestosterone with β-cyclopentylpropionyl bromide in benzene solution in the presence of a small amount of pyridine gave 10-normethyl-11β-hydroxytestosterone - 17 - (β-cyclopentyl)-propionate.

In the same manner as given in Preparations 2E, 2F, and 2G, 10-normethyl-11β-hydroxytestosterone-17-esters of other acids are prepared by the reaction of 10-normethyl-11β-hydroxytestosterone with acid anhydrides or halides, such as, for example, the acetate, butyrate, isobutyrate, valerate, isovalerate, hexanoate, heptanoate, octanoate, benzoate, phenylacetate, and other like esters of 10-normethyl-11β-hydroxytestosterone. Treatment of 10-normethyl-11β-hydroxytestosterone with formic acid results in 10-normethyl-11β-hydroxytestosterone formate.

*Example 1.—11-ketotestosterone propionate*

A solution of 1.48 grams of 11β-hydroxytestosterone-17-propionate (Preparation 1E) and eighty milliliters of acetic acid was treated with a solution of 0.74 gram of chromic acid anhydride in four milliliters of water and eighty milliliters of acetic acid and allowed to stand at room temperature for five hours. The excess of chromic acid was destroyed by the addition of ten milliliters of methanol and the solution was concentrated in vacuo on a water bath. The residue, after trituration with water, was extracted with ether and the ether solution washed with dilute sodium hydroxide solution and water, and then dried over anhydrous sodium sulfate. Upon evaporation of the ether there was obtained 1.29 grams of crystalline 11-ketotestosterone-17-propionate equal to a yield of 87 percent. 11-ketotestosterone-17-propionate, when recrystallized from ether-hexane (Skellysolve B) solution, melted at 139 to 140 degrees centigrade.

*Example 2.—11-ketotestosterone acetate*

A solution of 11β-hydroxytestosterone-17-acetate (Preparation 1D) in benzene was agitated for 12 hours with an aqueous solution of sodium dichromate and sulfuric acid. The benzene layer was separated from the aqueous solution, washed, dried over anhydrous sodium sulfate, and evaporated to yield 11-ketotestosterone-17-acetate.

In the same manner as given in Examples 1 and 2, 11-ketotestosterone-17-formate, 11-ketotestosterone-17-butyrate, 11-ketotestosterone-17-isobutyrate, 11-ketotestosterone-17-valerate, 11-ketotestosterone-17-isovalerate, 11-ketotestosterone - 17 - hexanoate, 11 - ketotestosterone-17-heptanoate, 11-ketotestosterone-17-octanoate, 11-ketotestosterone-17-benzoate, 11-ketotestosterone-17-phenylacetate, 11-ketotestosterone-17-(β-cyclopentyl)-propionate, and similar like 17-esters of 11-ketotestosterone are prepared by reaction of the corresponding 11β-hydroxytestosterone-17-ester with chromic anhydride in acetic acid or with an acidified dichromate solution.

*Example 3.—11-ketotestosterone*

A solution of 1.07 grams of 11-ketotestosterone-17-propionate in fifty milliliters of one Normal methanolic potassium hydroxide solution containing three milliliters of water was refluxed for a period of thirty minutes. The solution was poured onto ice and the mixture neutralized with dilute sulfuric acid. After standing, the resulting precipitate was recovered, washed with water and dried. The aqueous filtrate was extracted with methylene chloride to recover an additional amount of material. The total yield amounted to 97 percent. 11-ketotestosterone when recrystallized from methylene chloride melted at 187 to 188 degrees centigrade.

*Analysis.*—Calculated for $C_{19}H_{26}O_3$: C, 75.46; H, 8.67. Found: C, 75.63; H, 8.57.

In the same manner, hydrolysis of other esters of 11-ketotestosterone such as the formate acetate, butyrate, isobutyrate, valerate, isovalerate, hexanoate, heptanoate, octanoate, β-cyclopentylpropionate, benzoate, phenylacetate, and similar esters of 11-ketotestosterone with alkali-metal hydroxides such as sodium hydroxide or potassium hydroxide in methanol, ethanol, acetone, tertiary butyl alcohol, dioxane or other solvent is also productive of 11-ketotestosterone.

*Example 4.—10-normethyl-11-ketotestosterone propionate*

Oxidation of 10-normethyl-11β-hydroxytestosterone-17-propionate (Preparation 2F) in the manner shown in Example 1, yielded 10-normethyl-11-ketotestosterone propionate.

*Example 5.—10-normethyl-11-ketotestosterone*

Hydrolysis of 10-normethyl-11-ketotestosterone propionate with potassium hydroxide in aqueous methanol in the same manner as given in Example 3 resulted in 10-normethyl-11-ketotestosterone.

In the same manner as given in Example 4, 10-normethyl-11-ketotestosterone formate, 10-normethyl-11-ketotestosterone acetate, 10 - normethyl - 11 - ketotestosterone, butyrate, 10-normethyl-11-ketotestosterone isobutyrate, 10-normethyl-11-ketotestosterone valerate, 10-normethyl-11-ketotestosterone isovalerate, 10-normethyl-11-ketotestosterone hexanoate, 10-normethyl-11-ketotestosterone heptanoate, 10-normethyl-11-ketotestosterone octanoate, 10-normethyl-11-ketotestosterone β-cyclopentylpropionate, 10-normethyl-11-ketotestosterone benzoate, 10-normethyl-11-ketotestosterone phenyl acetate and other like esters may be prepared by reaction of the corresponding 10-normethyl-11-hydroxytestosterone-17-ester with chromic anhydride in acetic acid or with an acidified dichromate solution. These 10-normethyl-11-ketotestosterone-17-esters, when treated with alcoholic alkali hydroxide in the same manner as given in Example 3, yield 10-normethyl-11-ketotestosterone.

It is to be understood that the invention is not to be limited to the exact details or exact compounds shown and described as obvious modifications and equivalents will be apparent to one skilled in the art, and the invention is therefore to be limited only by the scope of the appended claims.

We claim:

1. A steroid compound represented by the following formula:

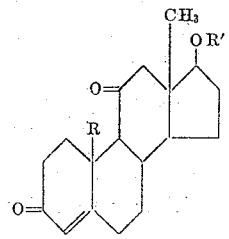

wherein R is selected from the group consisting of hydrogen and methyl and wherein R' is selected from the group consisting of hydrogen and the acyl radical of a hydrocarbon carboxylic acid containing from one to eight carbon atoms, inclusive.

2. 11-ketotestosterone.
3. 10-normethyl-11-ketotestosterone.
4. 11-ketotestosterone-17-esters wherein the 17-ester group is —O—CO—R, wherein R is a lower-alkyl radical.
5. 11-ketotestosterone acetate.
6. 11-ketotestosterone propionate.
7. 10-normethyl-11-ketotestosterone propionate.
8. In a process for the production of a compound selected from the group consisting of 11-ketotestosterone, 10-normethyl-11-ketotestosterone, and 17-esters thereof, the step which includes: treating a compound selected from the group consisting of 11β-hydroxy-17-acyloxytestosterone and 10-normethyl-11β-hydroxy-17-acyloxytestosterone, wherein the 17-acyloxy groups are of the formula AcO, Ac being the acyl radical of an organic carboxylic acid containing from one to eight carbon atoms inclusive, with chromic acid to obtain the corresponding 11-ketotestosterone ester.

9. In a process for the production of a compound selected from the group consisting of 11-ketotestosterone, 10-normethyl-11-ketotestosterone, and 17-esters thereof, the steps which include: treating a compound selected from the group consisting of 11β-hydroxy-17-acyloxytestosterone and 10-normethyl-11β-hydroxy-17-acyloxytestosterone, wherein the 17-acyloxy groups are of the formula AcO, Ac being the acyl radical of an organic carboxylic acid containing from one to eight carbon atoms inclusive, with chromic acid to obtain the corresponding 11-ketotestosterone ester, and contacting the 11-ketotestosterone ester with a base in solution to obtain the corresponding 11-ketotestosterone.

10. In a process for the production of 11-ketotestosterone and 17-esters thereof, the steps which include: treating a 11β-hydroxy-17-acyloxytestosterone, wherein the 17-acyloxy groups are of the formula AcO, Ac being the acyl radical of an organic carboxylic acid containing from one to eight carbon atoms, inclusive, with chromic acid to obtain the corresponding 11-ketotestosterone ester, and contacting the 11-ketotestosterone ester with a base in solution to obtain 11-ketotestosterone.

11. In a process for the production of 10-normethyl-11-ketotestosterone and 17-esters thereof, the steps which include: treating a 10-normethyl-11β-hydroxy-17-acyloxytestosterone, wherein the 17-acyloxy groups are of the formula AcO, Ac being the acyl radical of an organic carboxylic acid containing from one to eight carbon atoms, inclusive, with chromic acid to obtain the corresponding 11-ketotestosterone ester, and contacting the 11-ketotestosterone ester with a base in solution to obtain 10-normethyl-11-ketotestosterone.

12. A process for the production of 11-ketotestosterone which comprises: contacting 11β-hydroxytestosterone propionate with chromic acid to obtain 11-ketotestosterone propionate and hydrolyzing 11-ketotestosterone propionate with a base to obtain 11-ketotestosterone.

13. A process for the production of 10-normethyl-11-ketotestosterone which comprises: contacting 10-normethyl-11β-hydroxytestosterone propionate with chromic acid to obtain 10-normethyl-11-ketotestosterone propionate and hydrolyzing 10-normethyl-11-ketotestosterone propionate with a base to obtain 10-normethyl-11-ketotestosterone.

14. Compounds of the general formula:

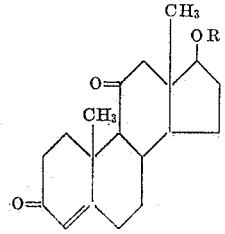

in which R is the acyl group of a hydrocarbon carboxylic acid containing from one to eight carbon atoms.

No references cited.